(12) United States Patent
Oguma (10) Patent No.: US 7,836,787 B2
(45) Date of Patent: Nov. 23, 2010

(54) SHIFT SYSTEM FOR BOAT PROPULSION UNIT

(75) Inventor: Takahiro Oguma, Shizuoka-ken (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 934 days.

(21) Appl. No.: 11/103,997

(22) Filed: Apr. 12, 2005

(65) Prior Publication Data
US 2005/0241425 A1 Nov. 3, 2005

(30) Foreign Application Priority Data
Apr. 12, 2004 (JP) ............................. 2004-117176

(51) Int. Cl.
*B63H 21/22* (2006.01)
(52) U.S. Cl. ............................. 74/473.1; 440/1; 701/21
(58) Field of Classification Search ............... 440/1, 440/84, 86; 74/473.1; 701/21; 477/111, 477/112
See application file for complete search history.

(56) References Cited

U.S. PATENT DOCUMENTS

| | | | |
|---|---|---|---|
| 4,493,662 A | 1/1985 | Taguchi | |
| 4,527,441 A | 7/1985 | Nakahama | |
| 4,549,869 A | 10/1985 | Iida | |
| 4,570,776 A | 2/1986 | Iwashita | |
| 4,579,204 A | 4/1986 | Iio | |
| 4,843,914 A | 7/1989 | Korke | |
| 4,903,662 A | 2/1990 | Hirukawa | |
| 4,924,724 A | 5/1990 | Yoshimura | |
| 4,963,109 A | 10/1990 | Hayasaka | |
| 4,973,274 A | 11/1990 | Hirukawa | |
| 5,006,084 A | 4/1991 | Handa | |
| 5,050,461 A | 9/1991 | Onoue | |
| 5,051,102 A | 9/1991 | Onoue | |
| 5,059,144 A | 10/1991 | Onoue | |
| 5,072,629 A | 12/1991 | Hirukawa | |
| 5,076,113 A | 12/1991 | Hayasaka | |
| 5,201,238 A | 4/1993 | Hayasaka | |
| 5,231,890 A | 8/1993 | Hayasaka | |
| 5,318,466 A * | 6/1994 | Nagafusa | ..................... 440/86 |
| 5,408,230 A * | 4/1995 | Okita | ......................... 340/825 |
| 5,445,546 A | 8/1995 | Nakamura | |
| 5,556,312 A | 9/1996 | Ogino | |
| 5,556,313 A | 9/1996 | Ogino | |

(Continued)

FOREIGN PATENT DOCUMENTS

JP 01-119499 5/1989

(Continued)

*Primary Examiner*—Richard W Ridley
*Assistant Examiner*—Alan B Waits
(74) *Attorney, Agent, or Firm*—Keating & Bennett, LLP (57) ABSTRACT

A shift system for a boat propulsion unit is provided comprising a remote control operation device having a remote control shift lever for shifting from a distance. A boat propulsion unit has a shift device for shifting and a shift actuator for actuating the shift device. A controller controls the actuation of the shift actuator according to the operation amount of the remote control shift lever, as the remote control shift lever is operated from a neutral position within a specified range of shift region. The controller controls the actuation amount of the shift actuator per unit operation amount of the remote control shift lever to be different in part of the shift region.

15 Claims, 11 Drawing Sheets

U.S. PATENT DOCUMENTS

| | | |
|---|---|---|
| 5,575,698 A | 11/1996 | Ogino |
| 5,597,334 A | 1/1997 | Ogino |
| 5,692,931 A | 12/1997 | Kawai |
| 5,697,821 A | 12/1997 | Ogino |
| 5,788,546 A | 8/1998 | Ogino |
| 5,827,150 A | 10/1998 | Mukumoto |
| 5,839,928 A | 11/1998 | Nakayasu |
| 5,910,191 A | 6/1999 | Okamoto |
| 6,015,319 A | 1/2000 | Tanaka |
| 6,098,591 A | 8/2000 | Iwata |
| 6,102,755 A | 8/2000 | Hoshiba |
| 6,123,591 A | 9/2000 | Onoue |
| 6,174,264 B1 | 1/2001 | Hoshiba |
| 6,217,400 B1 | 4/2001 | Natsume |
| 6,217,480 B1 | 4/2001 | Iwata |
| 6,295,884 B1 * | 10/2001 | Miyake et al. ............... 74/335 |
| 6,587,765 B1 * | 7/2003 | Graham et al. ............... 701/21 |
| 6,599,158 B2 * | 7/2003 | Shidara et al. ............... 440/1 |
| 6,834,876 B2 * | 12/2004 | Fukuda ....................... 280/261 |
| 2004/0093974 A1 * | 5/2004 | Nesseth .................... 74/473.12 |
| 2004/0204287 A1 * | 10/2004 | Vornhem et al. ............. 477/46 |

FOREIGN PATENT DOCUMENTS

| | | |
|---|---|---|
| JP | 11-334694 | 7/1999 |

* cited by examiner

SHIFT SYSTEM FOR BOAT PROPULSION UNIT

RELATED APPLICATIONS

The present application is based on and claims priority under 35 U.S.C. §119 to Japanese Patent Application No. 2004-117176 (field on Apr. 12, 2004), the contents of which is hereby incorporated by reference in their entirety and should be considered a part of this specification.

BACKGROUND OF THE INVENTION

1. Field of the Invention

This invention relates to a shift system for a boat propulsion unit.

2. Description of the Related Art

Conventionally, the boat propulsion unit is provided with a shift system for controlling forward, neutral, and reverse operation of a boat.

This shift system includes a normal turn gear and a reverse turn gear meshing with right and left sides of a drive gear coupled to a drive shaft which extends from an engine. A propeller shaft is fixed to a propeller and a dog clutch shift-transmits the rotation of the normal or reverse turn gear to the propeller shaft. A shift rod is used to slide the dog clutch to right and left directions.

The dog clutch is driven with a cam fixed to the fore-end of the shift rod. When the shift rod is turned in the normal turn direction, the dog clutch moves toward the left, so that the cogs of the dog clutch engage with the cogs of the normal turn gear. Rotation of the drive shaft is transmitted through the drive gear and the normal turn gear to the propeller shaft. When the shift rod is turned in the reverse turn direction, the dog clutch moves toward the right, so that the cogs of the dog clutch engage with the cogs of the reverse turn gear. Rotation of the drive shaft is transmitted through the drive gear and the reverse turn gear to the propeller shaft (See e.g. JP-A-Hei 11-334694 (pp. 1-6, FIGS. 1-8)).

Figure 11A:
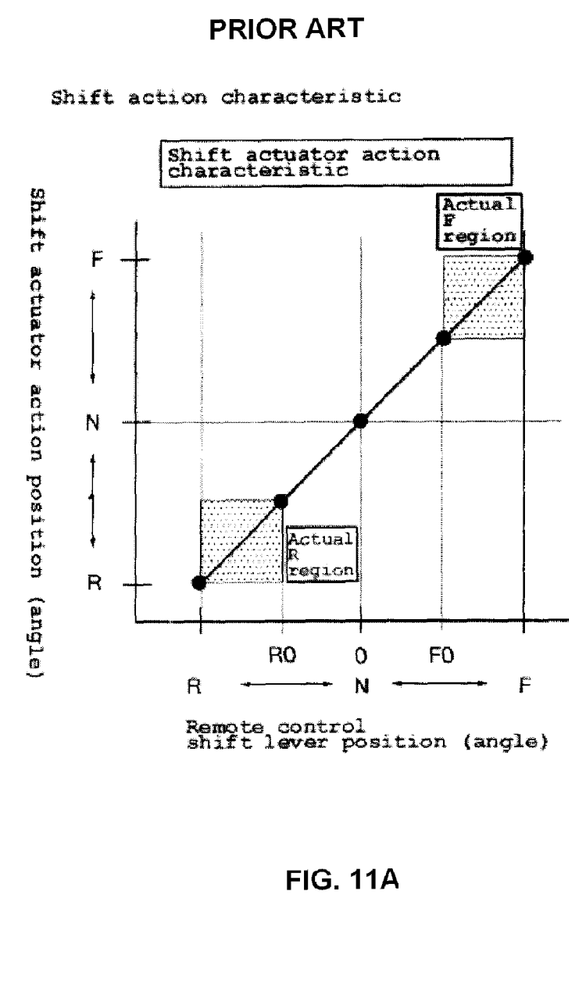
FIG. 11a is a graph of a conventional shift action characteristic.

In the shift system, for example, the turn of the shift rod is made by actuating a shift actuator by manipulating a remote control shift lever, as shown in FIG. 11A. The remote control shift lever is tilted forward from the neutral position (N) to the forward position (F), or from the neutral position (N) rearward to the reverse position (R). The shift output member of the shift actuator moves from the neutral position (N) to the forward position (F), or from the neutral position (N) to the reverse position (R) is controlled to be in proportion to the operation amount of the remote control shift lever.

Figure 11B:
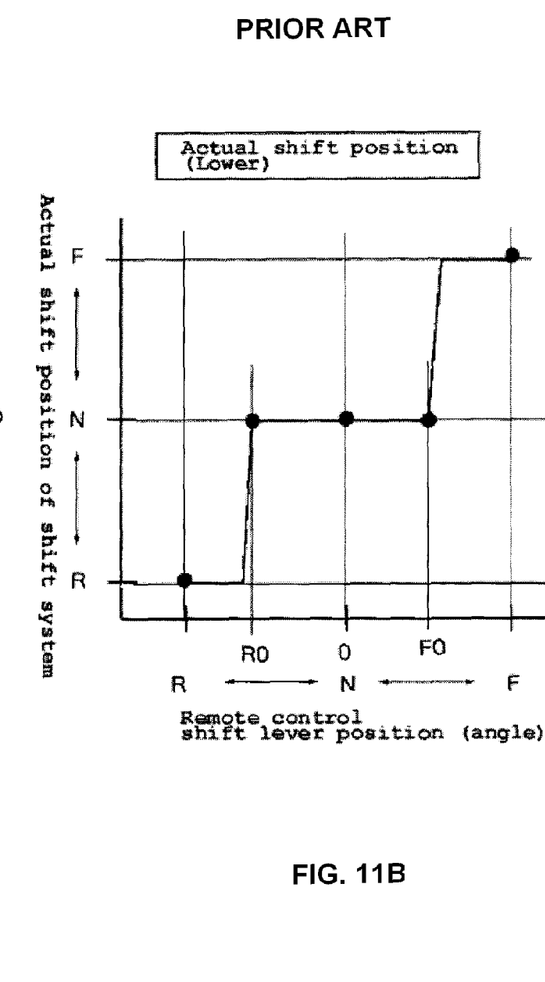
FIG. 11b is a graph of another conventional shift action characteristic.

On the other hand, as for the actual shift position of the shift system (see FIG. 11B), even when the remote control shift lever of the shift system is tilted forward by a specified angle from the neutral position (N), the dog clutch actually does not move until the shift lever angle reaches a specified angle (F0). When the specified angle (F0) is reached, the dog clutch moves to the forward position (F) and stops moving before the remote control shift lever comes to the forward position (F). Likewise, when the remote control shift lever is tilted rearward from the neutral position (N) by a specified angle, the dog clutch does not move until the shift lever angle reaches a specified angle (R0). When the specified angle (R0) is reached, the dog clutch moves to the reverse position (R) and stops moving before the remote control shift lever comes to the reverse position (R).

As described above, driving the shift actuator from a distance through the remote control shift lever operation, depending on the manner of action of the shift actuator corresponding to the remote control shift lever operation, may change the ease of use, or the response of, the dog clutch engagement and may give inconsistent feeling in the shift operation.

SUMMARY OF THE INVENTION

In accordance with one aspect of the invention, a shift system for a boat propulsion unit is provided that enables smooth shift operation with good responsiveness, alleviates excessive loads, and eliminates inconsistent feeling in the shift operation.

In accordance with another aspect of the invention, a shift system for a boat propulsion unit is provided comprising a remote control operation device having a remote control shift lever for shifting from a distance. A boat propulsion unit has a shift device for shifting and a shift actuator for actuating the shift device. A controller is configured to control the actuation of the shift actuator according to the operation amount of the remote control shift lever, as the remote control shift lever is operated from a neutral position within a specified range of shift region. The controller preferably controls the actuation amount of the shift actuator in a non-proportional manner relative to the operation amount of the remote control shift lever.

In accordance with another aspect of the invention, a shift system for a boat propulsion unit is provided comprising a remote control operation device having a remote control shift lever for shifting from a distance. A boat propulsion unit has a shift device for shifting and a shift actuator for actuating the shift device. A controller is configured to control the actuation of the shift actuator according to the operation amount of the remote control shift lever so that the remote control shift lever carries out a shift operation within a specified range of shift region from the neutral position. The controller actuates the shift actuator by a predetermined actuation amount when the remote control shift lever reaches a specified position.

DESCRIPTION OF THE DETAILED EMBODIMENTS

A shift system for a boat propulsion unit is described below by way of embodiments of the invention. However, the invention is not limited to the embodiments.

Figure 1:
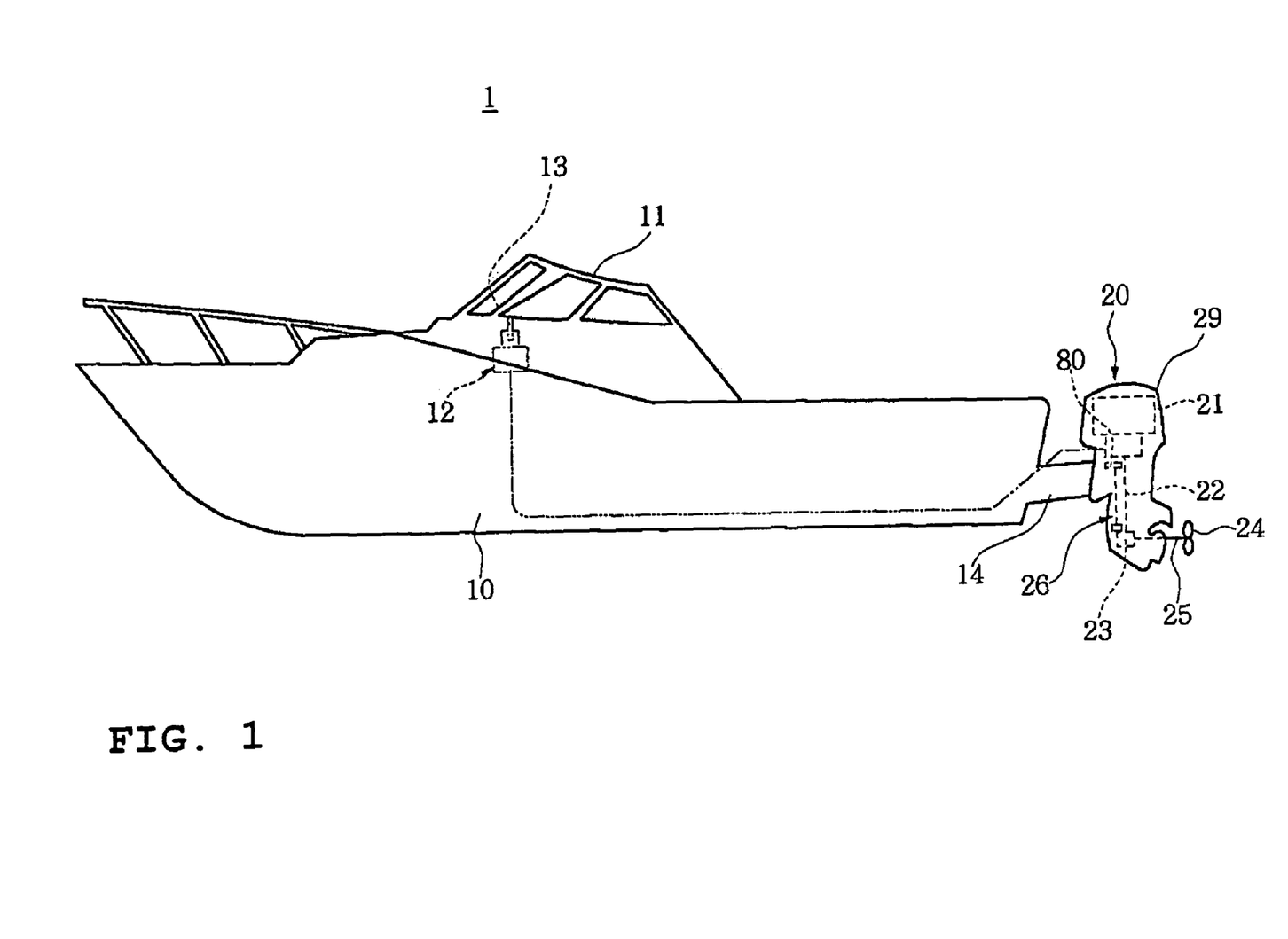
FIG. 1 is a side view of a boat provided with the shift system for the boat propulsion unit in accordance with one disclosed embodiment.

As shown in FIG. 1, a boat 1 is provided with a remote control operation device 12 in a cockpit 11 of a hull 10. The remote control operation device 12 has a remote control shift lever 13 to carry out shift operations from a distance. For example, the shift lever 13 can be used to operate the boat in forward, neutral, and reverse.

A boat propulsion unit 20 is preferably mounted on a rear part 14 of the hull 10. An engine 21 is preferably mounted in an upper part of the boat propulsion unit 20. Output of the engine 21 is transmitted to a propeller shaft 25 through a drive shaft 22 and a shift system 23. A propeller 24 is secured to the propeller shaft 25. Shifting the shift system 23 to the forward, neutral, and reverse operations is preferably carried out with a shift device 26 driven with an actuator 80.

Figure 2:
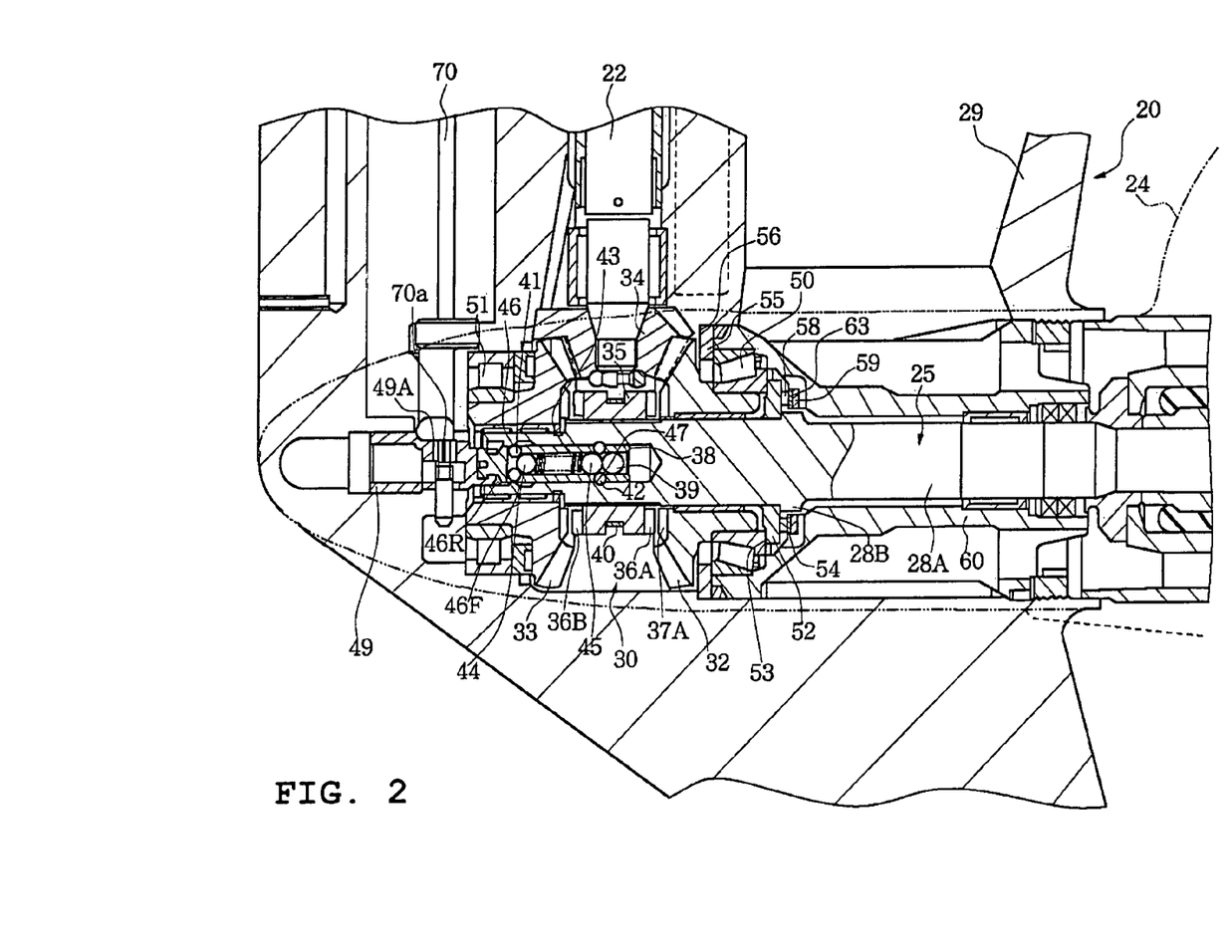
FIG. 2 is a partial cross-sectional view of one embodiment of a shift system.

As shown in FIG. 2, the boat propulsion unit 20 has a casing 29 in which is placed the propeller shaft 25 to which is attached the propeller 24. The propeller shaft 25 is preferably made of a single shaft member and connected to the drive shaft 22 through a gearing 30 for shifting to, for example, forward and reverse positions. The gearing 30 includes a forward gear 32 and a reverse gear 33, both positioned to freely rotate around the proper shaft 25. The gears 32, 33 both mesh with a pinion 34 fixed to the drive shaft 22 driven to rotate clockwise as seen from above, and are rotated in opposite directions to each other. The forward gear 32 is preferably placed on the side opposite the advancing direction (left in FIG. 2), while the reverse gear 33 is placed on the advancing direction side.

A sleeve-shaped dog clutch 35 is preferably spline-fitted around the propeller shaft 25 between the gears 32, 33. The dog clutch 35 is slidable in the axial direction of the propeller shaft 25. The dog clutch 35 is, on both its axial sides, provided with projecting cogs 36A, 36B. The gears 32, 33 are provided with cogs 37A, 37B facing the cogs 36A, 36B, respectively. In this way, a meshing clutch is formed.

A shift sleeve 38 is inserted into an attachment hole bored in the fore-end of the propeller shaft 25 from the end opposite the propeller 24. The side wall of the attachment hole in the propeller shaft 25 is provided with an elongate hole (not shown) extending in the axial direction. An insertion through-hole is preferably bored diametrically in the shift sleeve 38 and the dog clutch 35. A pin 39 is inserted through the insertion through hole in the dog clutch 35, the elongate hole in the propeller shaft 25, and through the insertion through-hole in the shift sleeve 38. Both ends of the pin 39 are preferably located near an annular groove formed in the outside round surface of the dog clutch 35. A circular spring 40 is fitted in the annular groove to prevent the pin 39 from coming off. As the shift sleeve 38 moves, the pin 39 moves in the axial direction within the range of the elongate hole, and the dog clutch 35 is moved with the pin 39.

In a preferred embodiment, a plurality of through-holes are bored along two planes, extending at right angles to the axis, and spaced in the axial direction, of the shaft sleeve 38. Detent balls 41 are placed in the front one of the through holes, and detent balls 42 are placed in the rear one of the through holes. The detent balls 41, 42 are placed so that at least a portion of the detent balls 41, 42 project into the inside holes of the shaft sleeve 38. In the illustrated embodiment, two pressing balls 44, 45 for shifting, movable in the axial direction within the inside hole of the shift sleeve 38, are inserted between the detent balls 41, 42. A shift spring 43 is interposed between the pressing balls 44, 45. With the resilient force of the shift spring 43, the pressing ball 45 comes into contact with both the round pillar-shaped pin 39 and the detent ball 42, the pressing ball 44 comes into contact with the detent ball 41, and both the detent balls 41, 42 are urged outward of the shift sleeve 38. Incidentally, the pin 39 is preferably inserted into the inside hole of the shift sleeve 38.

On the inside surface of the attachment hole in the fore-end portion of the propeller shaft 25 are formed an annular forward recess 46R near the front end, a projection 46, and a rearward recess 46F, in order from front to rear. An annular recess 47 is formed axially behind the projection 46 by the length between the detent balls 41, 42. When the dog clutch 35 shown in FIG. 2 is in the neutral position (neutral shift state), the detent ball 41 of the shift sleeve 38 is in contact with the projection 46 and, at the same time, the detent ball 42 is in engagement with the recess 47 for holding the neutral position. Likewise, when the dog clutch 35 is in the forward position (forward shift state), the detent ball 41 of the shift sleeve 38 engages with the rearward recess 46F for the forward position of the propeller shaft 25. When the dog clutch 35 is in the reverse position (reverse shift state), the detent ball 41 of the shift sleeve 38 engages with the forward recess 46R for the reverse position of the propeller shaft 25. When the detent ball 42 engages with the recess 47, or when the detent ball 41 engages with the rearward recess 46F or the forward recess 46R, the engaged state is held unchanged with the resilient force of the shift spring 43, so that each position is stabilized.

The fore-end of the shaft sleeve 38 projects out of the propeller shaft 25 and a cam follower 49 is preferably attached to the projecting end. As shown in FIG. 2, the cam follower 49 is provided with an engagement slot 49A extending vertically. In the lower part of a shift shaft 70 of the shift device 26, a drive pin 70a, provided in a crank-like eccentric position relative to the turning axis of the shift shaft 70, is fitted in the engagement slot 49A. With the turn of the shift shaft 70, when the drive pin 70a is preferably turned counterclockwise, as seen from above in FIG. 2, and the cam follower 49 moves rearward, which causes the dog clutch 35 to engage the forward gear 32. On the contrary, with the forward motion of the cam follower 49, the dog clutch 35 engages with the reverse gear 33.

As shown in FIG. 2, the forward gear 32 is supported through a taper bearing 50 on a holding cylinder 60 of the casing 29, and the reverse gear 33 is supported through a roller bearing 51 on the casing 29. A flange 52 is attached to the propeller shaft 25 for transmitting a thrust force exerted on the propeller shaft 25 to the casing 29. In the illustrated embodiment, the front face (left in FIG. 2) of the flange 52 defines the forward thrust transmitting portion 53, and the rear face of the flange 52 defines the reverse thrust transmitting portion 54. In the forward position, the forward thrust transmitting portion 53 of the flange 52 contacts the inner ring of the taper bearing 50, placed in the casing 29, to transmit thrust for forward motion. Similarly, in the reverse position, the reverse thrust transmitting portion 54 of the flange 52 contacts a washer 59 and a shim 63 held in the holding cylinder 60 of the casing 29 through a thrust bearing 58 to transmit thrust for reverse motion. Incidentally, the front face of the outer ring of the taper bearing 50 is preferably in contact, through a washer 55, with a step portion 56 formed on the casing 29.

In one embodiment, appropriate gaps are produced between the forward thrust transmitting portion 53 and the rear face of the inner ring of the taper bearing 50, and between the reverse thrust transmitting portion 54 and the thrust bearing 58, by adjusting the thickness of the washer 59 or the shim 63 when the dog clutch 35 is in the neutral position. That is, owing to the presence of the gaps when the dog clutch 35 is in the neutral position, the inner ring of the taper bearing 50 and the thrust bearing 58 do not receive thrust from the reverse thrust transmitting portion 54 and the forward thrust transmitting portion 53 of the flange 52. When the dog clutch 35 is in the forward position, the forward thrust transmitting portion 53 contacts the rear face of the inner ring of the taper bearing 50, and the reverse thrust transmitting portion 54 does not contact the thrust bearing 58. In contrast, when the dog clutch 35 is in the reverse position, the reverse thrust transmitting portion 54 contacts the thrust bearing 58, and the forward thrust transmitting portion 53 does not contact the rear face of the inner ring of the taper bearing 50. Incidentally, the holding cylinder 60 holds part of the propeller shaft 25 near its rear end and is fixed to the casing 29. The outer ring of the taper bearing 50 is held in the fore-end part of the holding cylinder 60.

The flange 52 and the shaft constituting member 28A of the propeller shaft 25 are preferably made of different materials. Additionally, the flange 52 is fitted around the shaft constituting member 28A from one side, opposite the propeller, of the propeller shaft 25. A radial inner part of the side face of the reverse thrust transmitting portion 54 is contact-stopped with a step portion 28B (e.g. a latch portion for positioning in axial direction) formed around the shaft constituting member 28A. In that state, the radial inner part of the side face of the forward thrust transmitting portion 53 is preferably fixed by welding to the outside circumference of the shaft constituting member 28A. The step portion 28B formed around the shaft constituting member 28A has a specified axial length, and an appropriate gap is provided between the outside round surface of the step portion 28B and the inside round surface of the washer 59 or the shim 63. The presence of the gap provides sufficient lubrication of the thrust bearing 58.

The action of this embodiment is described below. When the remote control shift lever 13 is operated to the forward position from the neutral position, in which the dog clutch 35 does not engage the gears 32, 33, the cam follower 49 is moved rearward by the shift shaft 70. This causes the shift sleeve 38 to move rearward, and the dog clutch 35 to mesh with the forward gear 32 through the pin 39. As a result, the rotation of the forward gear 32 is transmitted to the propeller shaft 25 through the dog clutch 35 to rotate the propeller 24 and propel the boat forward.

On the contrary, when the remote control shift lever 13 is operated to the reverse position, the dog clutch 35 likewise meshes with the reverse gear 33 to transmit the rotation of the reverse gear 33 to the propeller shaft 25, which rotates the propeller 24 in reverse to propel the boat in reverse.

Figure 3:
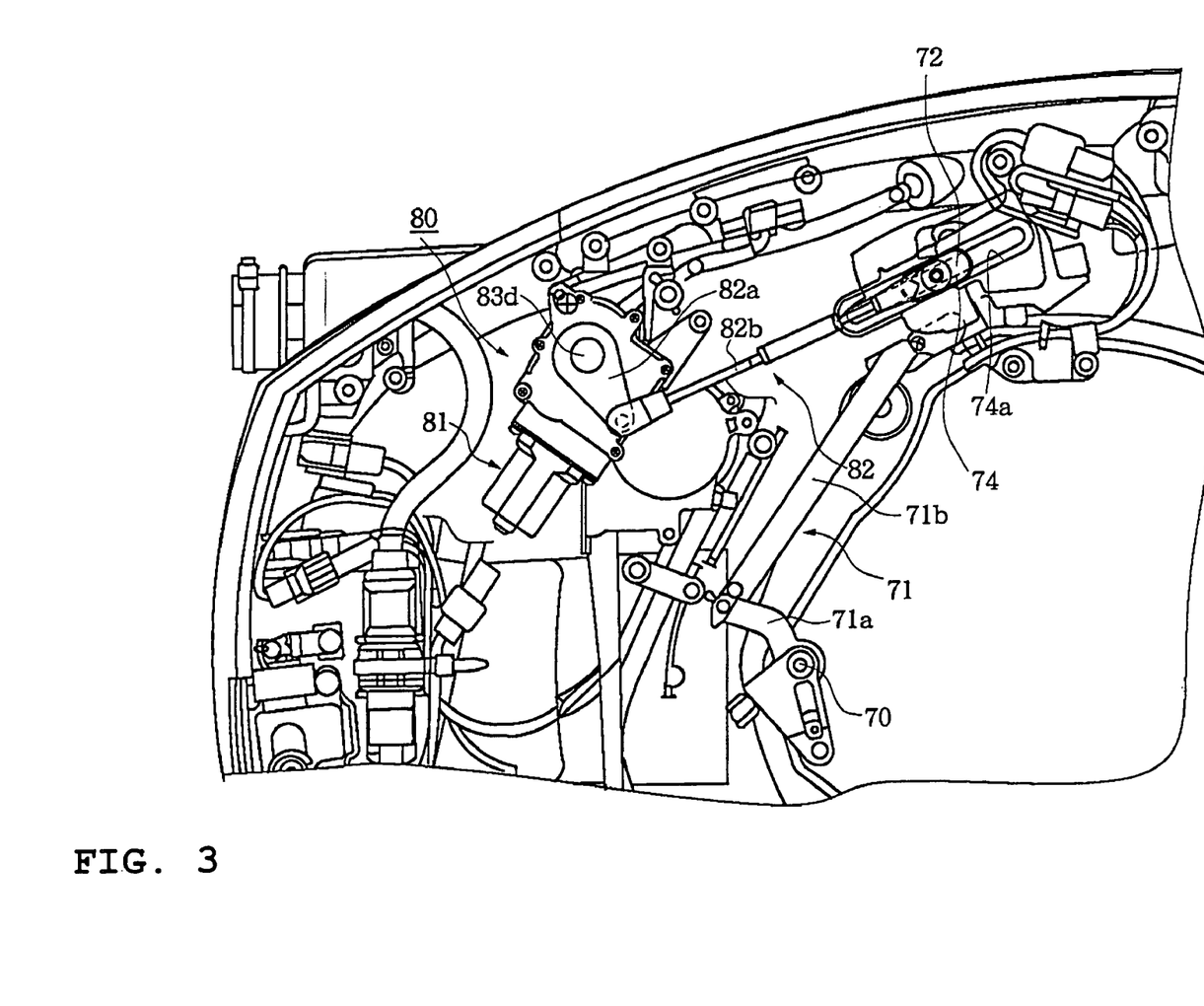
FIG. 3 is a sectional plan view of a boat propulsion unit having a shift device.
Figure 4:
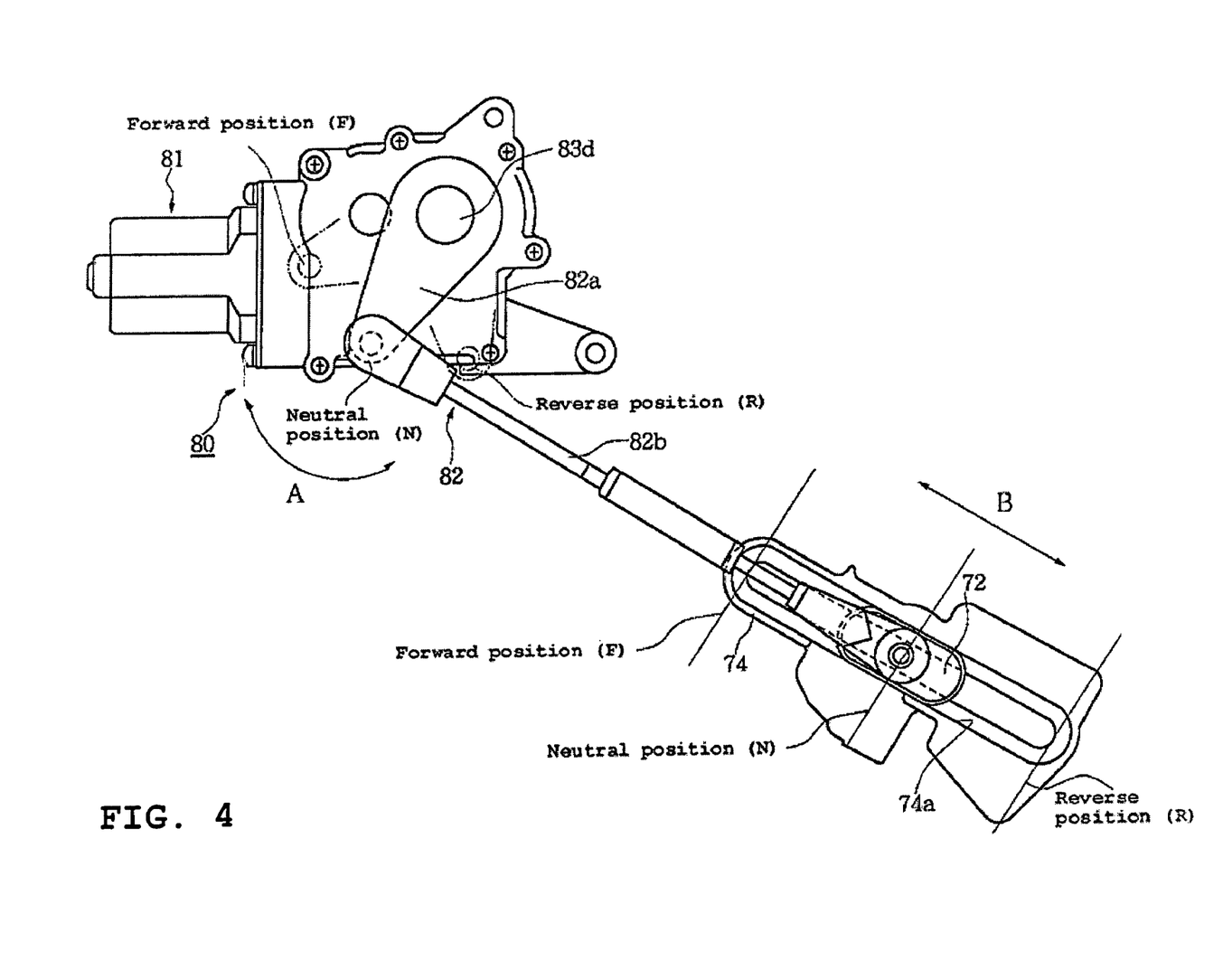
FIG. 4 is a side view of one configuration of a shift device in accordance with one disclosed embodiment.

As shown in FIGS. 3 and 4, the shift device 26 has a column gear shift 71. In the illustrated embodiment, the column gear shift 71 is configured so that one end of a link 71a is attached to the upper end of the shift shaft 70, on opposite end of the link 71a is connected to one end of a rod 71b, and an opposite end of the rod 71b is connected to a shift slider 72. The shift slider 72, which is preferably driven with a shift actuator 80 is disposed so as to be slidable in a guide slot 74a of a guide member 74.

Figure 5:
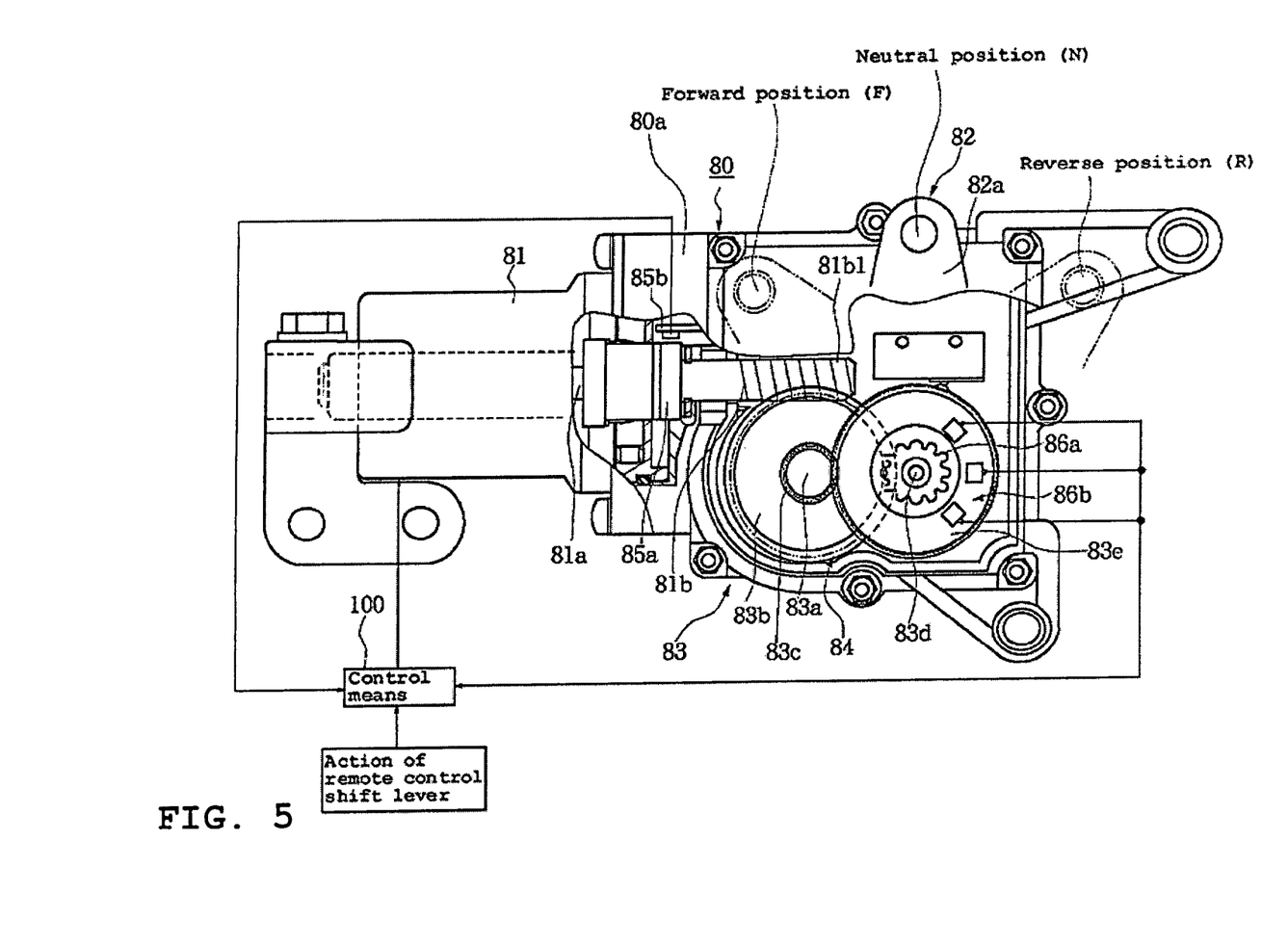
FIG. 5 is a side view of one configuration of a shift actuator in accordance with one disclosed embodiment.

In the illustrated embodiment, the shift actuator 80 includes an electric motor 81 as a drive source, a shift output member 82 for outputting power for driving the shift device 26, and a power transmitter 83 for reducing and transmitting the revolution of the electric motor 81 to the shift output member 82, as shown in FIG. 5. In a preferred embodiment, the electric motor 81 is a DC motor with its motor shaft 81a connected to a motor output shaft 81b. The power transmitter 83 preferably includes a large diameter gear 83b and a small diameter gear 83c provided on the axis of an intermediate shaft 83a, and a large diameter gear 83e provided on the axis of an output shaft 83d, with a group of these gears constituting a reduction gearing 84. The large diameter gear 83b preferably engages a worm gear 81b1 of the motor output shaft 81b, while the small diameter gear 83c meshes with the large diameter gear 83e. In the illustrated embodiment, the shift output member 82 has a shift arm 82a and a link rod 82b. The shift arm 82a is secured to the output shaft 83d. Preferably, one end of the link rod 82b is rotatably connected to the shift arm 82a. The other end of the link rod 82b is rotatably connected to the shift slider 72.

As shown in FIG. 5, a revolution detecting magnet 85a is provided on the motor output shaft 81b. A revolution detecting Hall element 85b is provided in a position, opposite the revolution detecting magnet 85a, on an actuator case 80a. A motor speed detector 85 is configured to detect the rotational speed of the electric motor 81. A shift output member position detecting magnet 86a is provided on the output shaft 83d. A shift output member position detecting Hall element 86b is provided in a position, opposite the shift output member position detecting magnet 86a, on the actuator case 80a. Thus, a shift position detector 86 is configured to detect the position of the shift output member 82.

Information on the revolution of the electric motor 81 coming from the motor speed detector 85 is preferably sent to a controller 100. Likewise, information on the position of the shift output member 82 coming from the shift position detector 86 is preferably sent to the controller 100. The controller 100 controls the electric motor 81 according to the action of the remote control shift lever 13, rotational speed of the electric motor 81, and the position of the shift output member 82.

Rotation of the electric motor 81 causes the rotation of the motor output shaft 81b, which is connected to the motor shaft 81a, and the large diameter gear 83b. As they are interlocked with the large diameter gear 83b, the small diameter gear 83c and the large diameter gear 83e also rotate, and the output shaft 83d rotates at a reduced revolution. The shift arm 82a turns in the directions of the arrow A via the rotation of the output shaft 83d. The shift arm 82a, through the link rod 82b, moves the shift slider 72 in the direction of the arrow B to shift between the forward, neutral, and reverse operations. Preferably, when the shift slider 72 is in the central position of the guide slot 74a, it is in the neutral position (N). Similarly, when the shift slider 72 is at the end of the guide slot 74a toward the shift actuator 80, it is in the forward position (F), and when it is at the opposite end, it is in the reverse position (R).

In this embodiment, the shift actuator 80 is made compact as the electric motor 81 is controlled according to the operation of the remote control shift lever 13, the rotational speed of the electric motor 81, and the position of the shift output member 82. In another embodiment, it is also possible to make the shift actuator 80 compact with the motor speed detector 85 and the shift position detector 86 including a magnet and a Hall element, instead of a potentiometer. Because the motor speed detector 85 and the shift position detector 86 are preferably of non-contact type, they are free from wear due to sliding motion, and their durability and reliability are advantageously improved.

Figure 6:
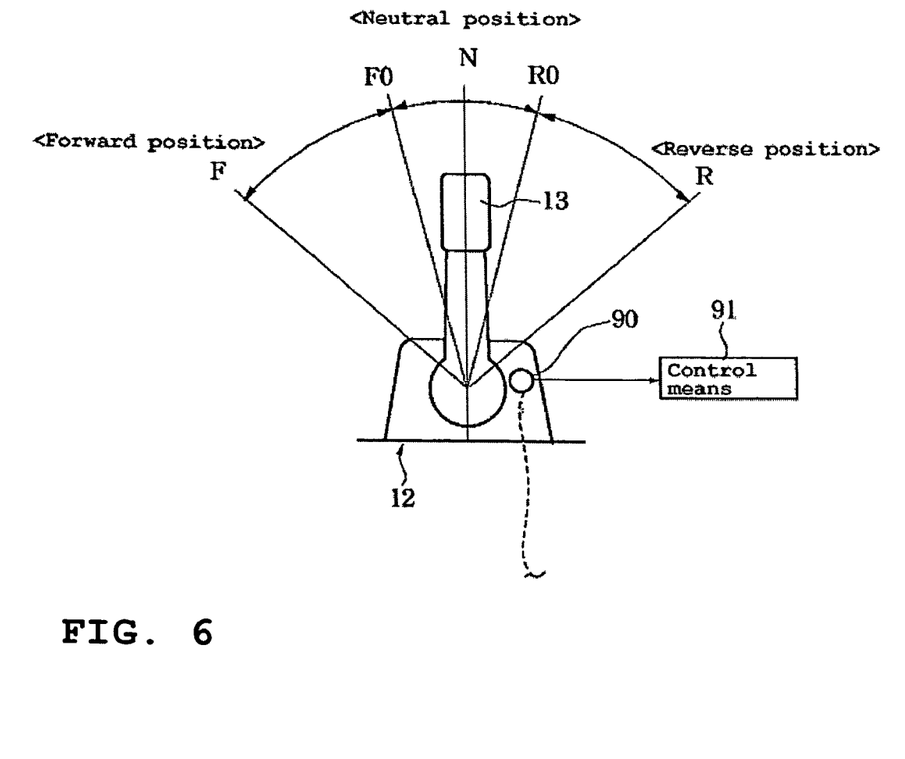
FIG. 6 is a schematic diagram of the actuation of the remote control operation device in accordance with one disclosed embodiment.

The remote control operation device 12 has the remote control shift lever 13 as shown in FIG. 6. Shifting the boat to the forward, neutral, and reverse operations is performed remotely with the remote control shift lever 13. In the illustrated embodiment, when the remote control shift lever 13 is upright, it is in the neutral position (N). When the remote control shift lever 13 is tilted forward by a specified angle (i.e., toward the left hand side in FIG. 6), it is in the forward position (F). When the remote control shift lever 13 is tilted rearward by a specified angle (i.e., toward the right hand side in FIG. 6), it is in the reverse position (R). Information on the speed and angle of the operation of the remote control shift lever 13 is preferably detected with a potentiometer 90 and communicated to a controller 91.

Figure 7:
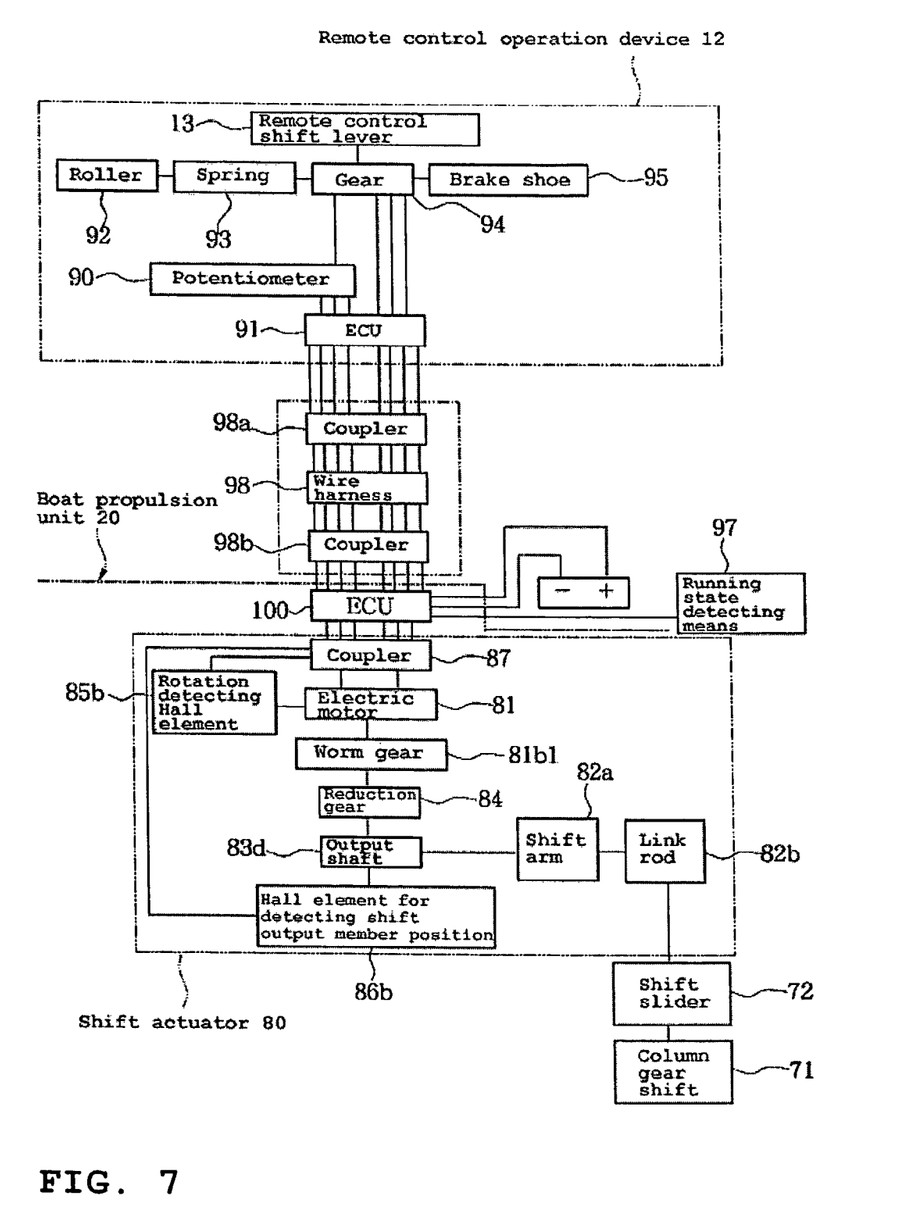
FIG. 7 is a block diagram of a shift system for the boat propulsion unit in accordance with one disclosed embodiment.

As shown in FIG. 7, the remote control operation device 12 is configured to shift to the forward, neutral, and reverse operations using the remote control shift lever 13 from a distance through a roller 92, a spring 93, a gear 94, and a brake shoe 95. The potentiometer 90, via the rotation of the gear 94, detects and sends information on the operation speed and angle of the remote control shift lever 13 to the controller 91.

The controller 91 provided in the remote control operation device 12 and the controller 100 provided in the boat propulsion unit 20 are preferably interconnected through couplers 98*a*, 98*b* provided at both ends of a wire harness 98 to enable communication between the remote control operation device 12 and the boat propulsion unit 20. In a preferred embodiment, the controller 100 is connected through a coupler 87 to the electric motor 81.

The boat propulsion unit 20 preferably has a running state detector 97 configured to detect the running state of the boat propulsion unit 20. In a preferred embodiment, the running state of the boat propulsion unit 20 is sent from the running state detector 97 to the controller 100.

The controller 100 preferably controls the actuation of the actuator 80 according to the operation amount of the remote control shift lever 13. In one embodiment, the controller 100 controls the actuation amount of the shift actuator 80 in a non-proportional manner relative to the operation amount of the remote control shift lever 13. In some embodiments, the controller 100 controls the actuation amount of the shift actuator in a generally step-wise manner, as shown in FIG. 8*a*.

The controller 100 also controls the actuation amount of the shift actuator 80 to be different according to the running state at the time of shifting. Preferably, the running state at the time of shifting is set according to at least one of the speed of the engine 21 and the rotational speed of the power transmitting mechanism such as, the drive shaft 22, the shift system 23, and the propeller shaft 25 mounted on the boat propulsion unit 20.

Figure 8A:
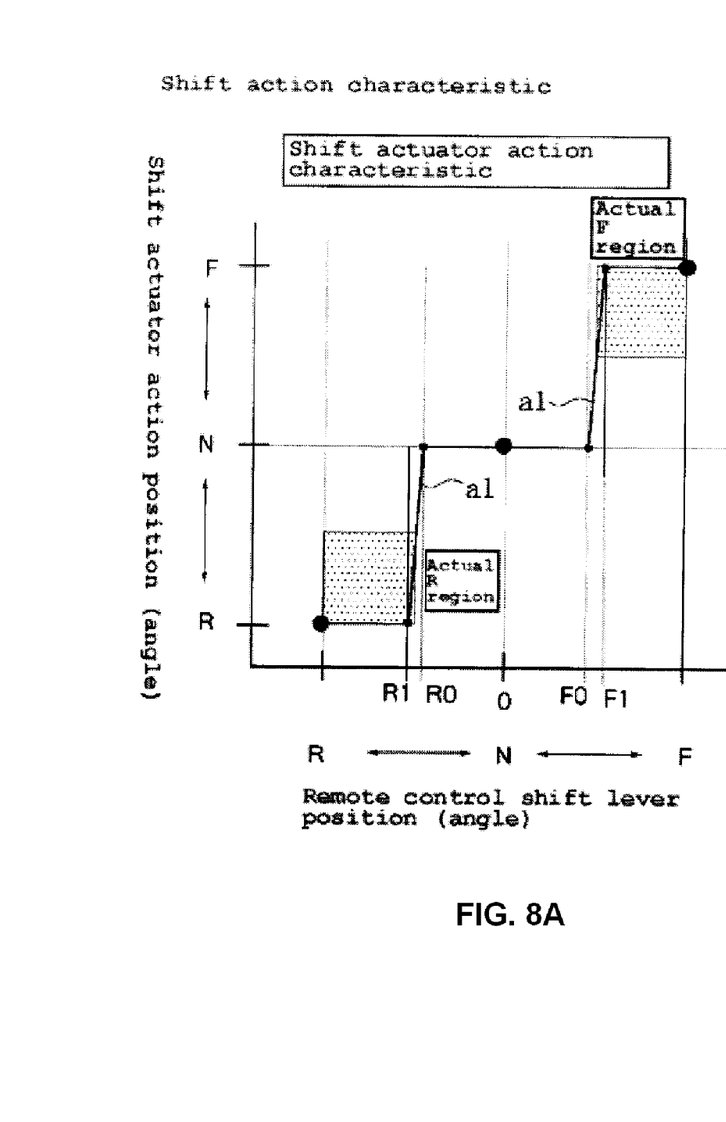
FIG. 8a is a graph of a shift action characteristic.
Figure 8B:
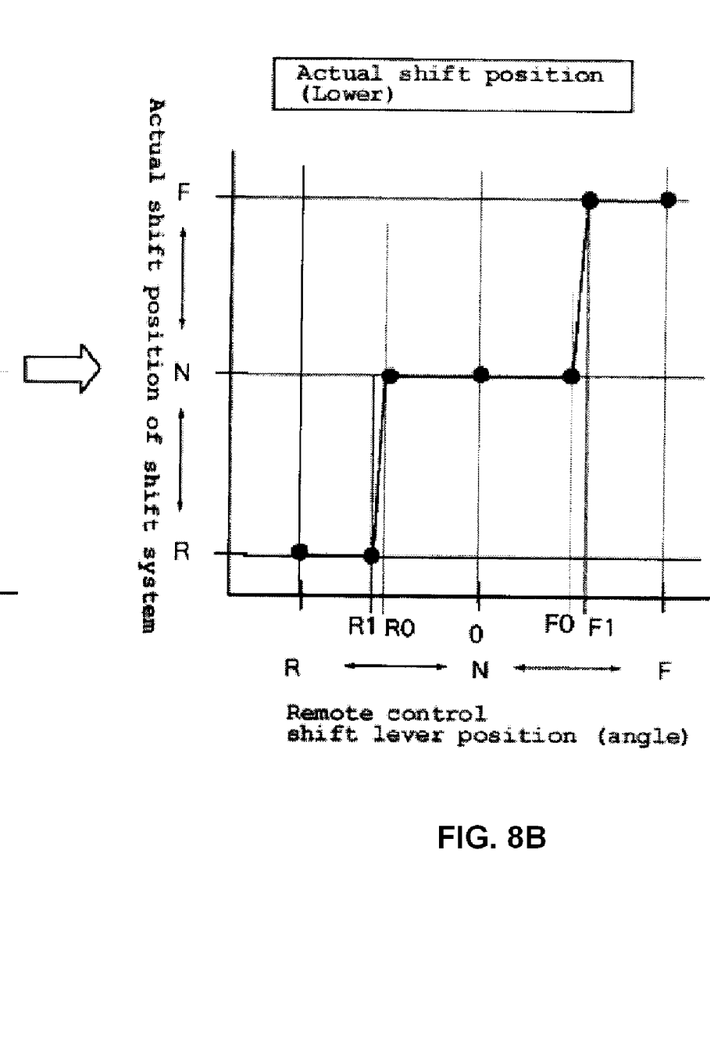
FIG. 8b is a graphic of another shift action characteristic.

FIGS. 8A-8B show the shift operation of the remote control shift lever 13 and the shift actuator 80. The remote control shift lever 13 is tilted forward by a specified angle from the neutral position (N) to the forward position (F), or rearward by a specified angle to the reverse position (R). When the remote control shift lever 13 is operated as described above, the shift output member 82 of the shift actuator 80 moves from the neutral position (N) to the forward position (F), or from the neutral position (N) to the reverse position (R), respectively.

In the illustrated embodiment, the shift actuator 80 is controlled not to work when the remote control shift lever 13 is between the neutral position (N) and a first specified position (F0, R0). This advantageously prevents electric power from being wasted near the neutral position, prevents an unnecessary load from being exerted on the shift device 26, and improves its durability.

The shift actuator 80 is also controlled not to work when the remote control shift lever 13 is between a second specified position (F1, R1) and the forward (F) or reverse (R) position. That is to say, because the shift actuator 80 does not work when the remote control shift lever 13 is operated in the outer region beyond the second specified position (F1, R1) relative to the neutral position (N), electric power is advantageously prevented from being wasted after the forward or reverse gear completes meshing with the dog clutch 35. Thus, unnecessary loads are prevented from being exerted on the shift device 26, and its durability is improved.

With this embodiment, the actuation amount of the actuator 80 per unit operation amount of remote control shift lever 13 is controlled to be different in part of the shift region. For example, the actuation amount of the actuator 80 can be controlled to be non-proportional to the operation amount of the remote control shift lever 13. Therefore, for example shocks at the time of shifting are appreciably reduced and the shift is advantageously made more stable and smooth. Ordinarily, there is a small time lag from the moment of sending a signal of the remote control shift lever 13 to the moment the shift actuator 80 actually begins action. Even in such a case, it is possible to eliminate the feeling of delayed actuation by setting a higher actuation speed of the shift actuator 80.

It is possible to set the actuation speed of the shift actuator 80 to a value at which the shift is made smooth by controlling that the actuation amount of the shift actuator 80 be different according to the running state or conditions of the boat propulsion unit 20. Because the actuation amount, actuation timing, and actuation speed of the shift actuator are changed according to either of the engine speed or the power transmission mechanism speed, the shift system is advantageously prevented from being subjected to excessive loads. Because the shift actuator 80 does not work even if the remote control shift lever 13 is operated between the neutral position (N) and the first specified position (F0, R0), electric power is also prevented from being wasted around the neutral position, unnecessary loads are prevented from being exerted to the shift device 26, and its durability is improved.

In the illustrated embodiment, when the remote control shift lever 13 is operated forward from the neutral position (N) and passes the first specified position (F0), the shift actuator 80 preferably works at a predetermined speed and actuation amount a1 and performs a shift from the neutral position (N) to the forward position (F) substantially automatically.

However, when the remote control shift lever 13 does not pass the second specified position (F1) and then passes the first specified position (F0)(i.e. when the remote control shift lever 13 is returned), the shift actuator 80 works to shift from the neutral position (N) to the forward position (F), and then from the forward position (F) to the neutral position (N) to return the shift. This is also the case when the remote control shift lever 13 is operated from the neutral position (N) to the reverse position (R).

Also, when the mechanism is shifted from the forward position (F) to the neutral position (N), the shift actuator 80 performs a predetermined action when the remote control shift lever 13 passes the second specified position (F1)(e. g., when the second specified position (F1) is detected) to shift from the forward position (F) to the neutral position (N). This is also the case for the reverse side.

In another embodiment, the shift actuator 80 works at a predetermined actuation amount when the remote control shift lever 13 reaches a specified position. The shift position detector 86 detects the completion of the shift operation and continues action of the shift actuator 80, once actuation is begun, until a completion of the shift is detected.

As described above, a predetermined shift operation is carried out in a stabilized manner without fine operation of the remote control shift lever 13 and without requiring skilled operation techniques. In the boundary region where the dog clutch 35 engages, the dog clutch 35 is advantageously prevented from repeating back-and-forth motion, the time for a dog clutch 35 engagement is shortened, wear of clutch gears is reduced, and the dog clutch 35 is advantageously prevented from being damaged.

Figure 9:
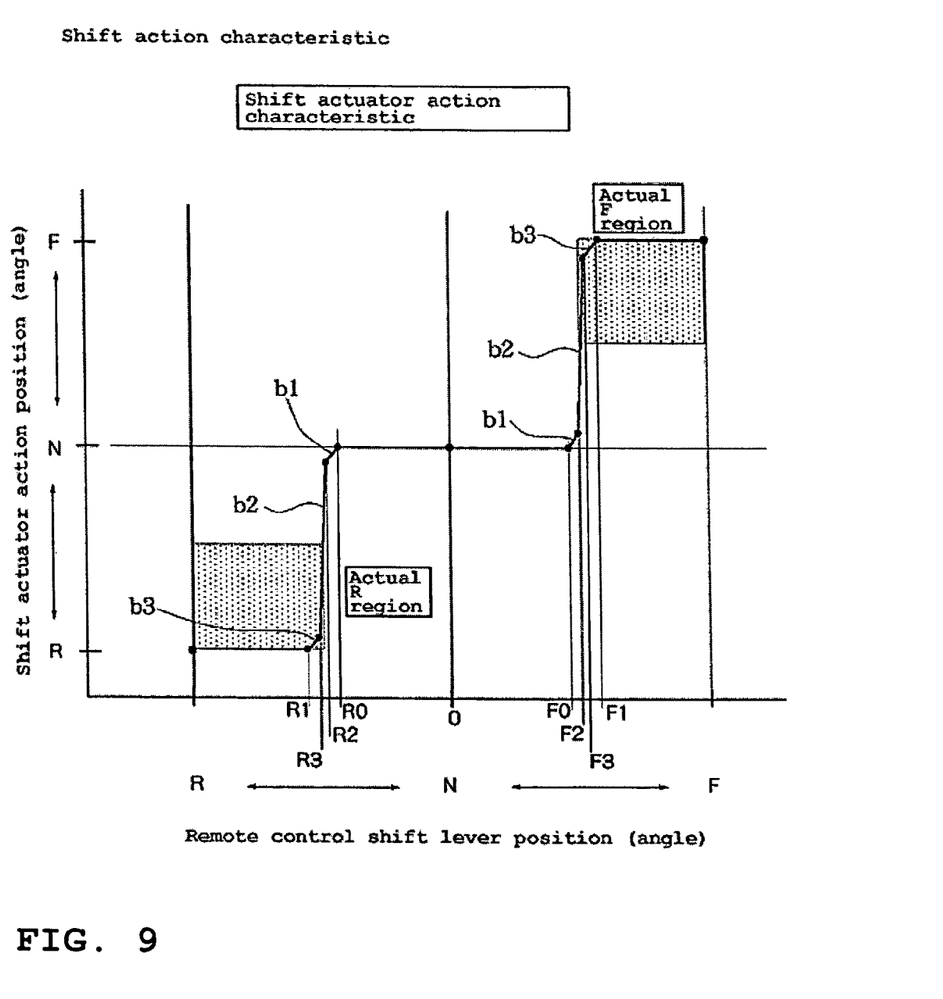
FIG. 9 is a graph of another shift action characteristic.

FIG. 9 shows another embodiment of the invention. In the illustrated embodiment, when the remote control shift lever 13 is operated from the neutral position (N) toward forward or reverse side and passes the first specified position (F0, R0), shift is carried out substantially automatically at a predetermined speed and actuation amount b1, b3. Shift shocks are advantageously reduced by setting slow shift speeds at the start of shifting (actuation amount of b1) and at the end of shifting (actuation amount of b3).

Figure 10A:
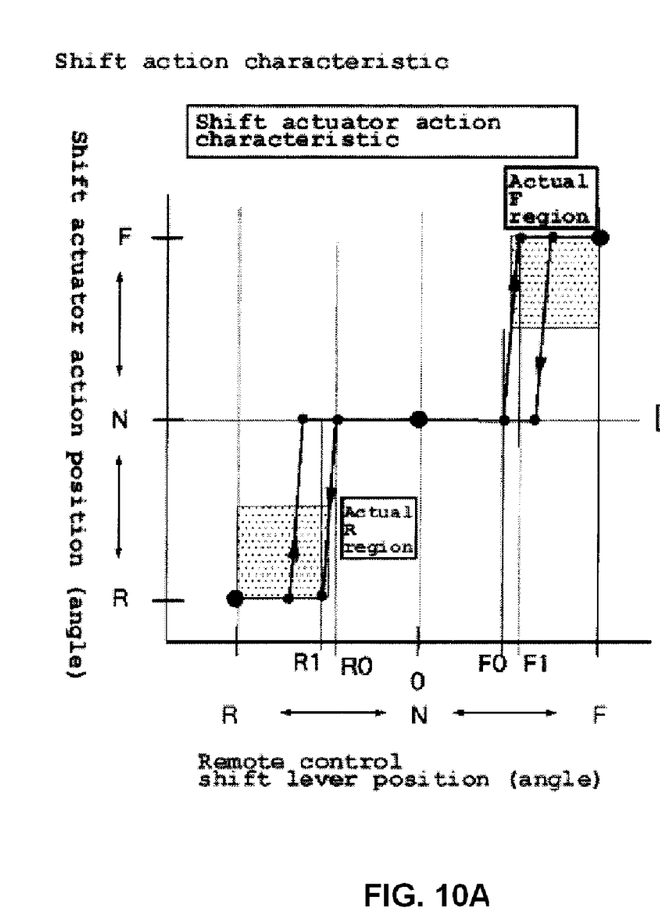
FIG. 10a is a graphic of another shift action characteristic.
Figure 10B:
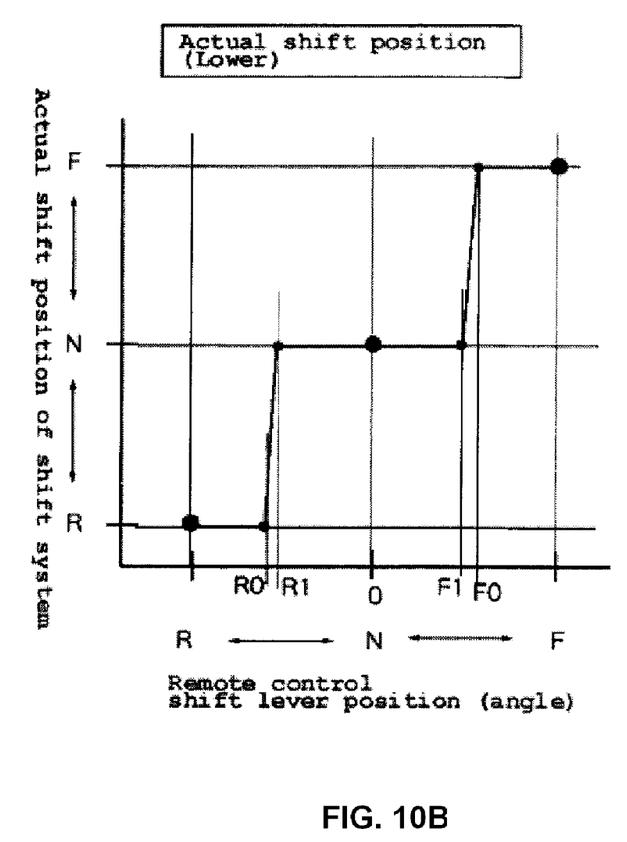
FIG. 10b is a graph of another shift action characteristic.

It is otherwise possible to control the actuation of the remote control shift lever 13 according to a hysteresis curve as shown in FIGS. 10a-b. Preferably, this hysteresis curve is pre-stored as a map in a memory of the controller 100. Actuation amount of the shift actuator 80 per unit operation amount of the remote control shift lever 13 is controlled according to the mapped hysteresis curve to be different in part of the shift region. With this embodiment, shift shocks are advantageously reduced as shown in FIGS. 8a to 10b. Stabilized, smooth, good-response shifting is possible without fine operation of the remote control shift lever 13 without skilled operation techniques. As for the small time lag from the moment a signal is sent from the remote control shift lever 13 to the moment the shift actuator 80 actually starts working, it is possible to eliminate the feeling of delayed actuation by setting a higher actuation speed of the shift actuator 80.

It is also possible, for example, to set the actuation speed of the shift actuator 80 to one at which shift is made easily according to the state of the engine operation. The state of the engine operation at the time of the shift is preferably set according to either the engine revolution or the revolution of the power transmission mechanism. Therefore, for example, when the engine revolution is high, setting the actuation speed of the shift actuator 80 to a low value advantageously makes it possible to alleviate heavy shocks or collision of shift gears and alleviate excessive loads on the shift device 26 and the shift system 23.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. For example, additional embodiments of a control routine for the ECU can be formed by combining various steps of the disclosed routines, as will be apparent to those skilled in the art. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A shift system for a boat propulsion unit comprising:
a remote control shift lever arranged to move through an operational range between forward, neutral, and reverse positions, the remote control shift lever disposed apart from the boat propulsion unit;
a shift device disposed on the boat propulsion unit and arranged to shift between forward, neutral, and reverse operations;
a shift actuator arranged to actuate the shift device;
a controller arranged and programmed to control the shift actuator according to a position of the remote control shift lever, the controller arranged and programmed to control the shift actuator to not move when the remote control shift lever is between the neutral position and a first position, to move when the remote control shift lever is between the first position and a second position, and to not move when the remote control shift lever is between the second position and the forward or the reverse position; and
a running state detector arranged to detect a running state of the boat propulsion unit; wherein
the shift actuator is controlled at least in part as a function of the running state;
the running state detected by the running state detector includes at least either a rotational speed of an engine mounted on the boat propulsion unit or a rotational speed of a power transmission mechanism; and
the controller is programmed to apply different actuation amounts to the shift actuator to move the shift actuator slower at a beginning and at an end of a shift operation relative to a middle portion of the shift operation.

2. The shift system for a boat propulsion unit according to claim 1, wherein the controller is programmed to control the shift actuator in a step-wise manner relative to the remote control shift lever as the remote control shift lever is moved between the forward, neutral, and reverse positions.

3. The shift system for a boat propulsion unit according to claim 1, wherein the controller is programmed to move the shift actuator based on a hysteresis curve.

4. The shift system for a boat propulsion unit according to claim 1, wherein the shift actuator further comprises:
an electric motor as a driving source;
a shift output member arranged to output power for driving the shift device;
a power transmitter arranged to reduce and transmit rotation of the electric motor to the shift output member;
a motor speed detector arranged to detect a rotational speed of the electric motor; and
a shift position detector arranged to detect a position of the shift output member, the controller being programmed to cause the electric motor to operate according to an operation amount or the position of the remote control shift lever, the rotational speed of the electric motor, and the position of the shift output member.

5. The shift system for a boat propulsion unit according to claim 4, wherein the motor speed detector and the shift position detector include a magnet and a Hall element.

6. A shift system for a boat propulsion unit comprising:
a remote control shift lever arranged to move through an operational range between forward, neutral, and reverse positions, the remote control shift lever disposed apart from the boat propulsion unit;

a shift device disposed on the boat propulsion unit and arranged to shift between forward, neutral, and reverse operations;

a shift actuator arranged to actuate the shift device;

a controller arranged and programmed to control the shift actuator according to the position of the remote control shift lever, the controller arranged and programmed to control the shift actuator to not move when the remote control shift lever is between the neutral position and a first position, to move when the remote control shift lever is between the first position and a second position, and to not move when the remote control shift lever is between the second position and the forward or the reverse position; and a shift position detector arranged to detect a completion of a shift between the forward, neutral, and reverse operations; wherein the shift actuator, once actuated, continues until the shift is completed regardless of the operation of the remote control shift lever; and the controller is programmed to apply different actuation amounts to the shift actuator to move the shift actuator slower at a beginning and at an end of a shift operation relative to a middle portion of the shift operation.

7. The shift system for a boat propulsion unit according to claim 6, wherein the controller is programmed to control the shift actuator in a step-wise manner relative to the remote control shift lever as the remote control shift lever is moved between the forward, neutral, and reverse positions.

8. The shift system for a boat propulsion unit according to claim 6, wherein the controller is programmed to move the shift actuator based on a hysteresis curve.

9. The shift system for a boat propulsion unit according to claim 6, wherein the shift actuator further comprises:

an electric motor as a driving source;

a shift output member arranged to output power for driving the shift device;

a power transmitter arranged to reduce and transmit rotation of the electric motor to the shift output member;

a motor speed detector arranged to detect a rotational speed of the electric motor; and a shift position detector arranged to detect a position of the shift output member, the controller being programmed to cause the electric motor to operate according to an operation amount or the position of the remote control shift lever, the rotational speed of the electric motor, and the position of the shift output member.

10. The shift system for a boat propulsion unit according to claim 9, wherein the motor speed detector and the shift position detector include a magnet and a Hall element.

11. A shift system for a boat propulsion unit comprising:

a remote control shift lever arranged to move through an operational range between forward, neutral, and reverse positions, the remote control shift lever disposed apart from the boat propulsion unit;

a shift device disposed on the boat propulsion unit and arranged to shift between forward, neutral, and reverse operations;

a shift actuator arranged to actuate the shift device;

a controller arranged and programmed to control the shift actuator according to a position of the remote control shift lever, the controller arranged and programmed to control the shift actuator to not move when the remote control shift lever is between the neutral position and a first position, to move when the remote control shift lever is between the first position and a second position, and to not move when the remote control shift lever is between the second position and the forward or the reverse position; wherein the controller is programmed to control a speed of the shift actuator during the shift operation based on an engine speed or a power transmission speed of the boat propulsion unit;

the speed of the shift actuator is lower when the engine speed is higher relative to when the engine speed is lower; and the controller is programmed to apply different actuation amounts to the shift actuator to move the shift actuator slower at a beginning and at an end of a shift operation relative to a middle portion of the shift operation.

12. The shift system for a boat propulsion unit according to claim 11, wherein the controller is programmed to control the shift actuator in a step-wise manner relative to the remote control shift lever as the shift lever is moved from the neutral position through the operational range.

13. The shift system for a boat propulsion unit according to claim 11, wherein the controller is programmed to move the shift actuator based on a hysteresis curve.

14. The shift system for a boat propulsion unit according to claim 11, wherein the shift actuator further comprises:

an electric motor as a driving source;

a shift output member arranged to output power for driving the shift device;

a power transmitter arranged to reduce and transmit rotation of the electric motor to the shift output member;

a motor speed detector arranged to detect a rotational speed of the electric motor; and a shift position detector arranged to detect a position of the shift output member, the controller programmed to cause the electric motor to operate according to an operation amount or the position of the remote control shift lever, the rotational speed of the electric motor, and the position of the shift output member.

15. The shift system for a boat propulsion unit according to claim 14, wherein the motor speed detector and the shift position detector include a magnet and a Hall element.

* * * * *